(12) United States Patent
Ookura

(10) Patent No.: US 11,294,348 B2
(45) Date of Patent: Apr. 5, 2022

(54) POSITION DETECTION DEVICE

(71) Applicant: FANUC CORPORATION, Yamanashi (JP)

(72) Inventor: Takuma Ookura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 172 days.

(21) Appl. No.: 16/857,917

(22) Filed: Apr. 24, 2020

(65) Prior Publication Data

US 2020/0393808 A1     Dec. 17, 2020

(30) Foreign Application Priority Data

Jun. 11, 2019   (JP) .............................. JP2019-108384

(51) Int. Cl.
  *G05B 19/402* (2006.01)
(52) U.S. Cl.
  CPC .. *G05B 19/402* (2013.01); *G05B 2219/42204* (2013.01)
(58) Field of Classification Search
  CPC ................ G05B 19/402; G05B 2219/42204
  See application file for complete search history.

(56) References Cited

U.S. PATENT DOCUMENTS

| 3,887,122 | A | * | 6/1975 | Sommeria | ............ | G05B 19/231 |
| | | | | | | 226/136 |
| 3,992,614 | A | * | 11/1976 | Buss | .................... | B23D 59/002 |
| | | | | | | 700/167 |
| 4,560,983 | A | * | 12/1985 | Williams | ............. | G05B 19/108 |
| | | | | | | 340/407.1 |
| 6,912,427 | B1 | * | 6/2005 | Pattee | .................. | G05B 19/042 |
| | | | | | | 318/600 |
| 6,973,353 | B1 | * | 12/2005 | Goldman | ............... | G05B 19/07 |
| | | | | | | 318/560 |
| 2004/0008002 | A1 | * | 1/2004 | Kamio | ...................... | H02P 6/12 |
| | | | | | | 318/701 |

(Continued)

FOREIGN PATENT DOCUMENTS

JP         2000-099156 A      4/2000

*Primary Examiner* — Ronald D Hartman, Jr.
(74) *Attorney, Agent, or Firm* — Studebaker & Brackett PC

(57) ABSTRACT

A position detection device according to the present disclosure includes: a detector which outputs a count value corresponding to a position of a detection target, and repeating values from zero until an upper limit value; an extended data storage unit which stores extended data corresponding to an integrated value of change amount in the count value by the rollover; a position calculation unit which calculates an absolute position of the detection target by adding the count value outputted by the detector and the integrated value indicated by the extended data; a section storage unit which, among count sections defined by dividing the range of the count value into at least three, stores the count section in which the count value received from the detector is included; and a confirmation processing unit which confirmation appropriateness of the extended data, based on an isolation number between the count section stored by the section storage unit during position detection processing start, and the count section in which the count value is included after position detection processing start.

4 Claims, 3 Drawing Sheets

(56) References Cited

U.S. PATENT DOCUMENTS

2009/0070514 A1\* 3/2009 Moriyama ........... G05B 19/054
　　　　　　　　　　　　　　　　　　　　　　710/311
2012/0265322 A1\* 10/2012 Hildebran .......... G05B 19/0426
　　　　　　　　　　　　　　　　　　　　　　700/9

\* cited by examiner

POSITION DETECTION DEVICE

This application is based on and claims the benefit of priority from Japanese Patent Application No. 2019-108384, filed on 11 Jun. 2019, the content of which is incorporated herein by reference.

BACKGROUND OF THE INVENTION

Field of the Invention

The present invention relates to a position detection device.

Related Art

Among position detection devices which control an industrial machine such as a machine tool or industrial robot, there is a device which detects the absolute position of a detection target using a detector that detects a count value corresponding to the position of the detection target, and controls the industrial machine based on the detected absolute position of the detection target (for example, refer to Patent Document 1). The detector which outputs such a count value is called an absolute position detector due to specifying the absolute position of the detection target. In the absolute position detector, there exists an upper limit value in the detectable position, i.e. count value.

Patent Document 1: Japanese Unexamined Patent Application, Publication No. 2000-99156

SUMMARY OF THE INVENTION

In the control device disclosed in Patent Document 1, the detector which detects the position has a counter that counts a rotation number, and a counter which counts a rotational position within one rotation. In addition, the control device of Patent Document 1 has a reference data storage unit that stores the output value (rotation number data) of the detector corresponding to the origin position of the absolute position, and calculates the absolute position (for example, machine coordinates) from the difference between the output value of the current position of the detector and the output value at the origin position.

Although differing according to the type of detector, an upper limit value (data length) exists in the count value of the rotation number of the detector. In many absolute position detectors, the count value returns to zero when exceeding the upper limit value. In other words, the count value of a general absolute position detector repeats values from zero to the upper limit value. For this reason, technology has been desired which can detect the absolute position based on the count value outputted from the detector, also in the case of the detection target having moved in a wide range exceeding the upper limit value of the detector.

A position detection device according to an aspect of the present disclosure includes: a detector which outputs a count value corresponding to a position of a detection target, and repeating values from zero until an upper limit value; an extended data storage unit which stores extended data corresponding to an integrated value of change amount in the count value by the rollover, in a case of there being rollover of the count value transitioning between zero and the upper limit value; a position calculation unit which calculates an absolute position of the detection target by adding the count value outputted by the detector and the integrated value indicated by the extended data; a section storage unit which, among count sections defined by dividing the range of the count value into at least three, stores the count section in which the count value received from the detector is included; and a confirmation processing unit which confirms appropriateness of the extended data, based on an isolation number between the count section stored by the section storage unit at position detection processing start, and the count section in which the count value is included after position detection processing start.

According to the present disclosure, it is possible to detect the absolute position based on the count value outputted from the detector, also in the case of the detection target having moved in a wide range exceeding the upper limit value of the detector, and it is possible to detect an accurate absolute position also in a case of the detection target having moved to a position exceeding the detection range of the detector during detection processing interruption.

DETAILED DESCRIPTION OF THE INVENTION

Figure 1:
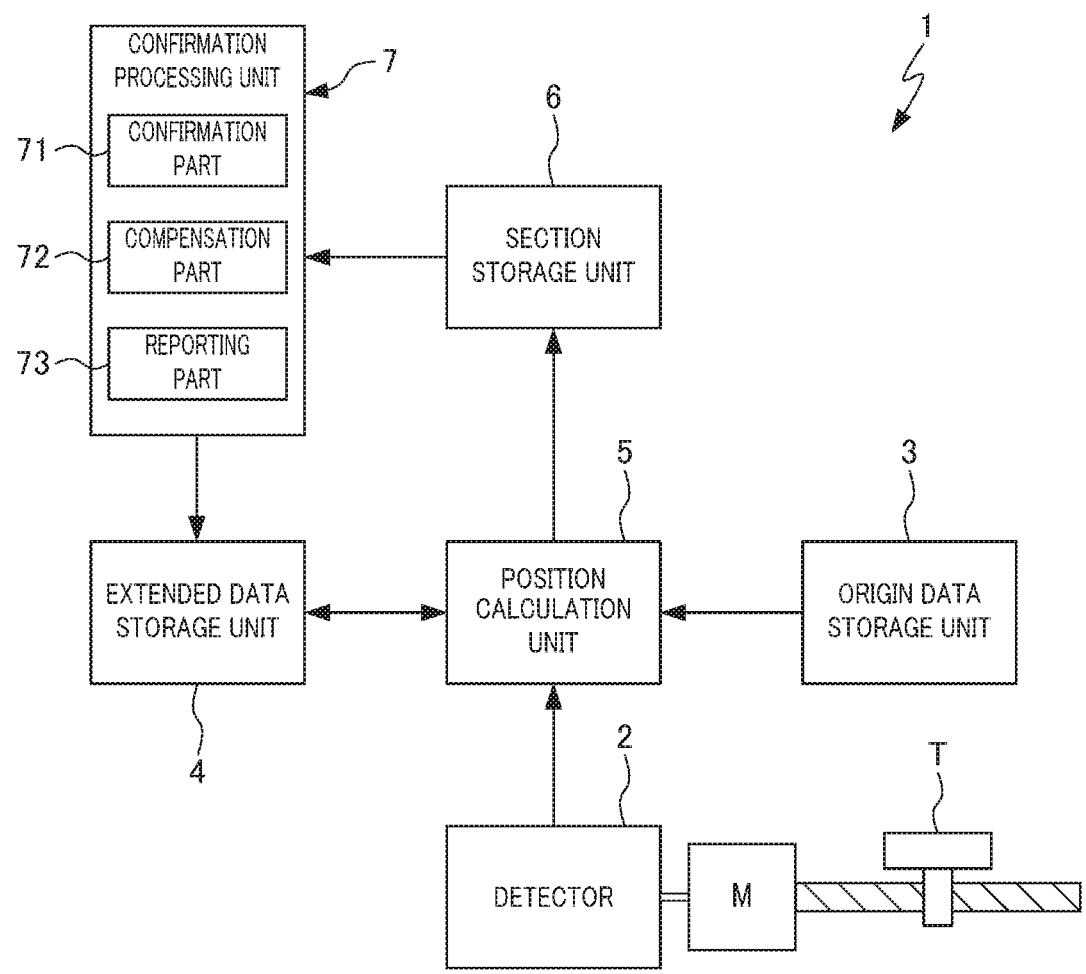
FIG. 1 is a block diagram showing the configuration of a position detection device according to an embodiment of the present disclosure.

Hereinafter, a position detection device according to the present disclosure will be explained while referencing the attached drawings. FIG. 1 is a block diagram showing the configuration of a position detection device 1 according to an embodiment of the present disclosure. The position detection device 1 detects the absolute position of a detection target T which is linearly driven. The detection target T can be established as a table or the like driven by a feed screw in a machine tool, for example.

The position detection device 1 includes: a detector 2, an origin data storage unit 3, an extended data storage unit 4, a position calculation unit 5, a section storage unit 6, and a confirmation processing unit 7. In the position detection device 1, the origin data storage unit 3, extended data storage unit 4 and section storage unit 6 are configured by nonvolatile memory or the like which can retain information even in a case of stopping the detection operation of the position detection device 1. The origin data storage unit 3, extended data storage unit 4 and section storage unit 6 may be configured by the same memory. In addition, the position calculation unit 5 and confirmation processing unit 7 can be realized by causing the appropriate program to be executed in an arithmetic device such as a CPU, for example, and may not necessarily be able to be clearly distinguished in the physical structure or program structure. It should be noted that the origin data storage unit 3, extended data storage unit 4, position calculation unit 5, section storage unit 6 and confirmation processing unit 7 may be parts of a numerical control device controlling a machine tool, a robot control device controlling a robot, or the like, for example.

The detector 2 outputs a count value which repeats values from zero to the upper limit value, corresponding to the position of the detection target T. The detector 2 may be configured so as to output the rotation number count value incrementing or decrementing by one per one rotation (increments by one during rotation in the positive direction, and decrements by one during rotation in the negative direction) of a drive axis driving the detection target T as the count value, and output angle data within one rotation of the drive axis. As a specific example, the detector 2 can be established as a well-known absolute value encoder installed so as to detect the rotation amount of a drive axis driving a ball screw or the like driving the detection target T, output shaft of a motor, or a rotary axis of a power train transmitting the rotation of the motor to the ball screw or the like.

The rotation number count value outputted by the detector 2 is a non-negative integer, and rollover to transition to zero occurs when reaching a predetermined upper limit value. In addition, regarding the rotation number count value, when the detection target T further moves in the negative direction from a position at which the value thereof is zero, the value thereof transitions from zero to the upper limit value. The angle data outputted by the detector 2 is also a non-negative integer, and rollover to transition between the maximum value and zero occurs every time the drive axis rotates once. The rotation number count value increases or decreases when the angle data rolls over.

As the upper limit value of the rotation number count value of the detector 2, for example, 4095 (12 bit data), 65535 (16 bit data), etc. are assumed. Since the movement amount of the detection target T per one rotation of the drive axis becomes on the order of 1 mm to 10 mm normally, when the rotation number count value of the detector 2 increases from zero to the upper limit value, the detection target T is considered to move from several m to hundreds of m.

The origin data storage unit 3 stores, as the origin data, the value of the rotation number count value and angle data outputted by the detector 2 when arranging the detection target T at the origin determined for convenience. It is thereby made possible for the position calculation unit 5 described later to calculate the absolute position of the detection target T with the origin as reference.

The extended data storage unit 4, in the case of the rotation number count value received from the detector 2 rolling over, stores the extended data equivalent to the integrated value of the change amount of the rotation number count value according to rollover. The extended data may set as a count value adding "1" when rollover in the positive direction in which the rotation number count value transitions from the upper limit value to zero occurs, and "−1" when rollover in the negative direction transitioning from zero to the upper limit value occurs. It may be set as a value integrating the change amount (decrement preferably defined as positive value) of the rotation number count value due to rollover.

The position calculation unit 5 calculates the absolute position of the detection target T by adding the rotation number count value and angle data received from the detector 2, and integrated value of the change amount of rotation number count value due to rollover indicated by the extended data stored in the extended data storage unit 4. In addition, the position calculation unit 5 may convert the absolute position of the detection target T into the position in a coordinate system used in control of the detection target T by the machine tool or the like, by subtracting the value of the origin data stored in the origin data storage unit 3.

The section storage unit 6 stores the count sections in which the rotation number count value received from the detector 2 is included, among at least three count sections demarcated by dividing the area of the rotation number count value (from zero until upper limit value). The count section being set by equally dividing N times the area of the rotation number count value is preferable from the viewpoint of a reduction in data volume, lightening of computational load, and accuracy improvement of determination of confirmation processing unit 7. As the number N of count sections, it is necessary to set to at least 3 in order to compensate the extended data, and it is preferable to set to at least 4 in order to detect the abnormal movement of the detection target T. In addition, the number N of count sections is preferably smaller from the viewpoint of a reduction in data volume. Therefore, the number N of the count sections is preferably set to 3 or 4.

The confirmation processing unit 7, during position detection processing start of the position detection device 1, confirms the appropriateness of extended data stored in the extended data storage unit 4 based on the isolation number between the count section stored by the section storage unit 6 from before the position detection processing start; and a count section in which the rotation number count value received from the detector 2 is included after position detection processing start. The confirmation processing unit 7 can be established as a configuration having a confirmation part 71 which calculates the isolation number, a compensation part 72 which compensates the extended data with the appropriate value according to the isolation number, and a reporting part 73 which performs reporting in a case of the value of the extended data being considered inappropriate.

In the detector 2, while the position detection device 1 is interrupting the position detection processing, if the detection target T is made to move exceeding the position where the rotation number count value rolls over, the extended data stored in the extended data storage unit 4 will become an incorrect value. In this case, after the start of position detection processing of the position detection device 1, the position calculation unit 5 cannot correctly calculate the absolute position of the detection target T. Therefore, the confirmation processing unit 7 determines the appropriateness of extended data stored in the extended data storage unit 4, when the position detection device 1 starts the position detection processing.

Figure 2:
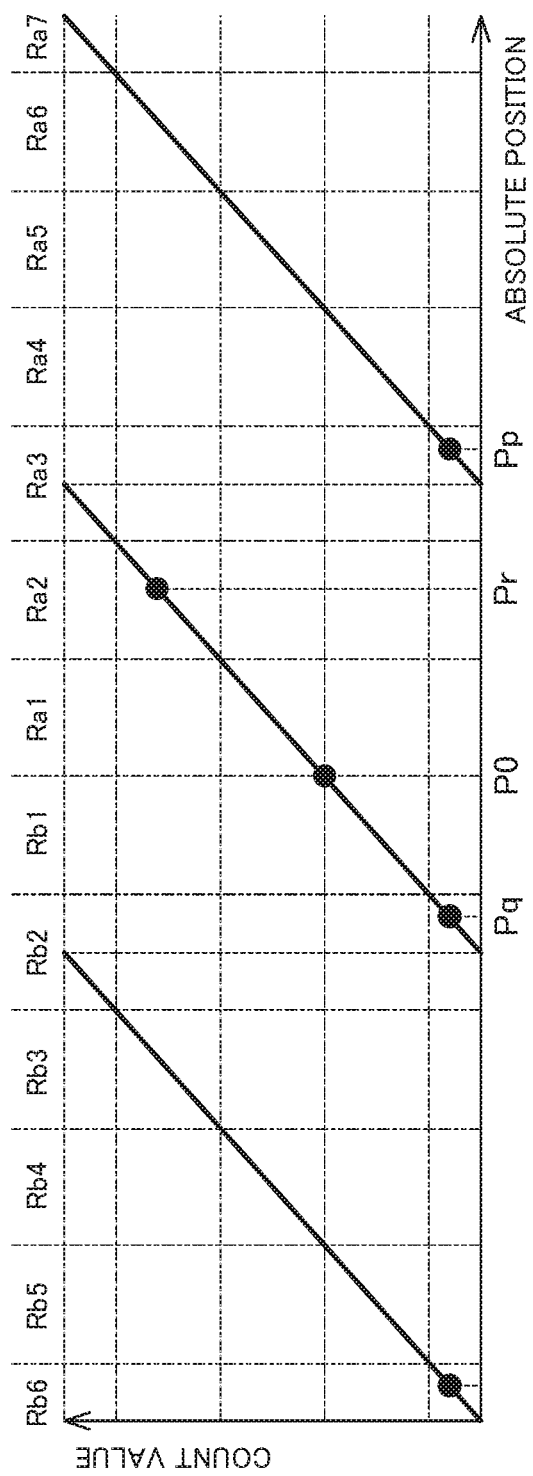
FIG. 2 is a view showing the relationship between a count value and absolute position of a detector of the position detection device in FIG. 1.

FIG. 2 shows a relationship between the count value of the detector 2 and the absolute position of the detection target T. FIG. 2 is an example made by dividing area of the rotation number count values into four count sections based on the origin position P0. The positive direction count section from the origin position is defined as Ra1, R2 ... Rai (i is a positive integer), and the positive direction count section from the origin position is defined as Rb1, Rb2 ... Rbj (j is a positive integer). In the illustrated example, due to dividing based on the origin position, the count sections Rb6, Rb2, Ra3, Ra7 are demarcated spanning a region including the upper limit value of the rotation number count value and a region including zero.

FIG. 2 exemplifies the absolute position of the detection target T prior to the position detection device 1 interrupting the detection processing by Pr, and the absolute position of the detection target T when the position detection device 1 starts the position detection processing by Pp. The illustrated example shows a case in which the rotation number count value of the absolute position Pr prior to detection processing interruption is a value near the upper limit thereof, and the detection target T is made to move exceeding the rollback position during detection processing interruption. In this case, the actual absolute position after position detection processing start is Pp; however, due to the extended data of the extended data storage unit 4 not being updated during detection processing interruption, it is determined that the detection target T is present at absolute position Pq when calculating the absolute position in the position calculation unit 5 as is.

The confirmation part 71 specifies the count section (Ra2 in the illustrated example) to which the rotation number count value prior to detection processing interruption belongs, and defines this as the reference section. In addition, the compensation part 72 specifies the count section (Rb2 in the illustrated example) to which the absolute position Pq shown by the rotation number count value received after position detection control start belongs, and defines this as the first section. Furthermore, the confirmation part 71 defines the count section (Ra3 in the illustrated example) of the Nth section in the positive direction from the first section as the second section, and defines the count section (Rb6 in the illustrated example) of the Nth section in the negative direction from the first section as the third section. Then, the confirmation part 71 respectively calculates the isolation number from the reference section until the first section, second section and third section, i.e. how many count sections the first section, second section and third section are from the reference section (isolation numbers in illustrated example become 3, 1 and 7 in order).

In the aforementioned way, the area of the rotation number count value corresponds to several m to hundreds of m when converted into the movement distance of the detection target T; therefore, the detection target T during detection processing interruption is hardly considered to move across several count sections. For this reason, among the first section, second section and third section, it is highly probable that the section having the smallest isolation number will be the count section in which the actual detection target T exists. Therefore, in the case of the isolation number of the second section or third section being smaller than the isolation number of the first section, it can be determined that the value of the extended data stored in the extended data storage unit 4 is inappropriate.

The confirmation part 71 calculates the isolation numbers of the reference section and the respective first section, second section and third section. The isolation number is a relative value, and does not depend on the number of times of rollover prior to detection processing interruption. For this reason, the confirmation part 71 does not confirm the extended data stored in the extended data storage unit 4 during position detection control start, and may specify the reference section, first section, second section and third section as a section for which there was no rollover prior to detection processing interruption. The confirmation part 71 can thereby confirm the appropriateness of the extended data stored in the extended data storage unit 4 during position detection control start, by a relatively simple calculation.

The compensation part 72 determines the count section (second section R2b in the illustrated example) for which the isolation number from the reference section is the smallest among the first section, second section and third section as the count section corresponding to the absolute position of the actual detection target T, and compensates the extended data stored in the extended data storage unit 4 so that the count section of the absolute position calculated by the position calculation unit 5 matches this.

The reporting section 73 performs reporting of an event of there being a high possibility of appropriateness of the extended data being inappropriate, when the isolation number exceeds a predetermined threshold. In the aforementioned way, it is hardly considered that the detection target T will greatly move during detection processing interruption, and in the case of the isolation number exceeding a threshold, since it can be considered that the detection target T has been greatly moved artificially by any abnormal or special circumstances, it is made possible prompt the operator to confirm by performing reporting of this event, and confirm after the fact.

For the threshold for the isolation number set in the reporting part 73, it is necessary to set to at least 1 in order to provide a count section determining the extended data as appropriate, and it is necessary to set as no more than (N/2−1) in order to set as a value smaller than N/2, which is the maximum value for the isolation number.

Figure 3:
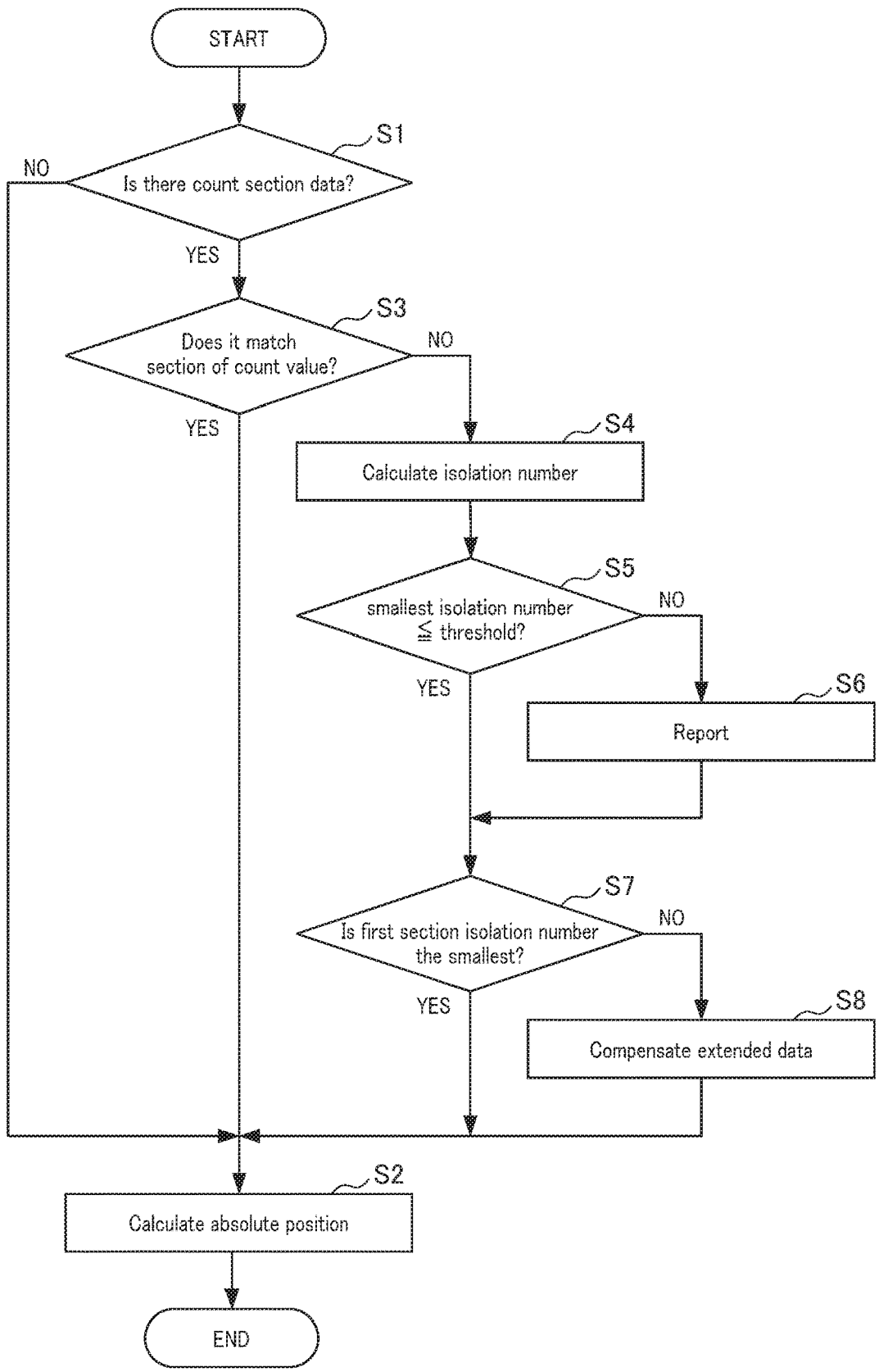
FIG. 3 is a flowchart showing an absolute position detection sequence of the position detection device in FIG. 1.

FIG. 3 shows a sequence of the position detection processing in the position detection device 1. This position detection processing includes: first a step of confirming whether the count section data is stored in the section storage unit 6 (Step S1: count section data confirmation step); a step of calculating the absolute position of the detection target by the position calculation unit 5 (Step S2: absolute position calculation step); a step of confirming whether the count section data stored in the section storage unit 6 and the count section to which the rotation number count value received from the detector 2 belongs match (Step S3: count section confirmation step); a step of calculating the isolation numbers of the first section, second section and third section (Step S4: isolation number calculation step); a step of comparing the minimum value among the isolation numbers of the first section, second section and third section with the threshold (Step S5: threshold comparison step); a step of reporting that movement of the detection target during control step is abnormal (Step S6: reporting step); a step of confirming whether the isolation number of the first section is a minimum (Step S7: first section confirmation step); and a step of compensating the extended data (Step S8: extended data compensation step).

(Count Section Data Confirmation Step)

In the count section data confirmation step of Step S1, it is confirmed whether the count section data is stored in the section storage unit 6. If the count section data is not stored in the section storage unit 6, since there is no information to consider, the processing advances to Step S2 immediately; however, in the case of the count section data being stored in the section storage unit 6, the processing advances to Step S3.

(Absolute Position Calculation Step)

In the absolute position calculation step of Step S2, the position calculation unit 5 calculates the absolute position of the detection target T, based on the rotation number count value and angle data received from the detector 2, the extended data stored by the extended data storage unit 4, and the origin data stored in the origin data storage unit 3.

(Count Section Confirmation Step)

In the count section confirmation step of Step S3, it is confirmed whether the count section data of the section storage unit 6 and count section to which the current rotation number count value belongs match. In the case of the count section data of the section storage unit 6 and the count section to which the current rotation number count value belongs matching, since it is considered that the detection target T is not greatly moving during control interruption, the processing advances to Step S2 without performing special processing, and calculates the absolute position of the detection target T. On the other hand, in the case of the count section data of the section storage unit 6 and the count section to which the current rotation number count value belongs differing, since it is considered that the detection target T is significantly moved, the processing of Step S4 and later is performed.

(Isolation Number Calculation Step)

In the Isolation number calculation step of Step S4, the confirmation part 71 specifies the reference section (count section stored by the section storage unit 6), first section (count section to which the current rotation number count value belongs), second section (Nth count section in positive direction from the first section) and third section (Nth count section in negative direction from the first section), and calculates the respective isolation numbers of the first section, second section and third section from the reference section.

(Threshold Comparison Step)

In the threshold comparison step of Step S5, the minimum values of the isolation numbers of the first section, second section and third section are compared with thresholds set in advance. In the case of the minimum value of the isolation number being greater than the threshold, since it is determined that the movement amount of the detection target T during control stop is abnormal, the processing of Step S6 is performed. On the other hand, in the case of the minimum value of the isolation number being no more than the threshold, since it is determined that the movement amount of the detection target T during control interruption is within the range in which abnormality can occur, the processing advances to Step S7.

(Reporting Step)

In the reporting step of Step S6, the reporting part 73 outputs a notification signal indicating that the movement of the detection target during control interruption is abnormal. The position detection device 1 may have a reporting device that receives the notification signal outputted by the reporting part 73 and notifies to the operator by way of visual information or audio information. As such a reporting device, it is possible to use a buzzer that emits a mechanical sound, a speaker which emits an alarm sound or voice message, an indicator light which notifies by light emission, a display which performs a warning display on the screen, or the like.

In the present embodiment, after outputting a notification signal in the reporting step, the processing advances to Step S7; however, it may be configured so as to end processing in the case of outputting a notification signal.

(First Section Confirmation Step)

In the first section confirmation step of Step S7, the size relationship of the isolation number of the first section, second section and third section is confirmed. In the case of the isolation number of the first section being the smallest, since it is considered that there is no error in the extended data stored in the extended data storage unit 4, the processing advances to Step S2 as is, and calculates the absolute position of the detection target T. On the other hand, in the case of the isolation number of the second section or third section being smaller than the isolation number of the first section, the processing advances to Step S8.

(Extended Data Compensation Step)

In the extended data compensation step of Step S8, since it is considered that the rotation number count value rolled over during control interruption in the direction corresponding to the smaller isolation number of the second section and third section, compensation is performed to add the change amount in the case of rolling over one time in the direction corresponding to the smaller isolation number of the second section and third section, to the value of the extended data stored in the extended data storage unit. After compensating the extended data, the processing advances to Step S2, and calculates the absolute position of the detection target using the compensated extended data.

In the above way, the position detection device 1, due to including the extended data storage unit 4 which stores the extended data corresponding to a value arrived at by integrating the change amount by rollover of the rotation number count value, can detect the absolute position of the detection target T based on the rotation number count value outputted from the detector 2, in a wide range exceeding the upper limit value of the detector 2.

In addition, the position detection device 1, due to include the confirmation processing unit 7 having the section storage unit 6 and compensation part 72, can accurately calculate the absolute position of the detection target T, due to being able to compensate the extended value to an appropriate value, also in the case of the detection target T being moved to exceed the position at which the rotation number count value rolls over, during position detection processing interruption. In particular, with the section storage unit 6 and confirmation processing unit 7, due to confirming the appropriateness of the extended data based on a relatively small number of count sections demarcated by dividing the range of rotation number count values, the handled data amount is less.

In addition, with the position detection device 1, since the confirmation processing unit 7 has the reporting part 73 which performs reporting in the case of the isolation number of the count section being excessively large, can notify and record that the movement amount of the detection target T during position detection processing interruption is great, and preemptively prevent trouble or verify trouble afterwards.

Although an embodiment of the present disclosure has been explained above, the present invention is not to be limited to the aforementioned embodiment. In addition, the effects described in the present embodiment are merely listing the most favorable effects produced from the present invention, and the effects from the present invention are not to be limited to those described in the present embodiment.

In the position detection device according to the present disclosure, the extended data storage unit may store the extended data as the sum of the integrated value for the change amount of rotation number count value from rollover and the values of the rotation number count value outputted from the detector when the detection target is located at the origin. The calculation of the absolute position of the detection target in the position calculation unit thereby becomes easy.

In the position detection device according to the present disclosure, the confirmation processing unit may be a unit without a compensation part or reporting part. In addition, the confirmation processing unit may be configured so as not to perform compensation of the extended data by the compensation part in the case of the isolation number exceeding the threshold and reporting being performed by the reporting part. It is thereby possible to preserve the extended data when reception of the count value is interrupted, and facilitate specifying the cause for the isolation number becoming large.

EXPLANATION OF REFERENCE NUMERALS

1 position detection device
2 detector
3 origin data storage unit
4 extended data storage unit
5 position calculation unit
6 section storage unit
7 confirmation processing unit
71 confirmation part 72 compensation part
73 reporting part
T detection target

What is claimed is:

1. A position detection device comprising:
a detector which outputs a count value corresponding to a position of a detection target, and repeating values from zero until an upper limit value;
an extended data storage unit which stores extended data corresponding to an integrated value of change amount in the count value by the rollover, in a case of there being rollover of the count value transitioning between zero and the upper limit value;
a position calculation unit which calculates an absolute position of the detection target by adding the count value outputted by the detector and the integrated value indicated by the extended data;
a section storage unit which, among count sections defined by dividing the range of the count value into at least three, stores the count section in which the count value received from the detector is included; and
a confirmation processing unit which confirms appropriateness of the extended data when position detection processing start, based on an isolation number between the count section stored by the section storage unit, and the count section in which the count value is included after position detection processing start.

2. The position detection device according to claim 1, wherein the confirmation processing unit has a compensation part which increases or decreases a change amount of the count value per one time rollover, in the extended data so that the isolation number becomes smaller.

3. The position detection device according to claim 1, wherein the confirmation processing unit has a reporting part which performs reporting when the isolation number exceeds a predetermined threshold.

4. The position detection device according to claim 1, wherein the detector increments or decrements by one the count value per one rotation of a drive axis which drives the detection target, and outputs angle data within one rotation of the drive axis, and
wherein the position calculation unit calculates the absolute position by further adding the angle data.

* * * * *